(12) United States Patent
Gintz

(10) Patent No.: US 10,122,157 B1
(45) Date of Patent: Nov. 6, 2018

(54) PANEL WIRE SUPPORT BRACKETS

(71) Applicant: William Gary Gintz, Boise, ID (US)

(72) Inventor: William Gary Gintz, Boise, ID (US)

(73) Assignee: Sticnstac, LLC, Boise, ID (US)

( * ) Notice: Subject to any disclaimer, the term of this patent is extended or adjusted under 35 U.S.C. 154(b) by 0 days.

(21) Appl. No.: 15/694,687

(22) Filed: Sep. 1, 2017

Related U.S. Application Data

(63) Continuation of application No. 15/156,145, filed on May 16, 2016.

(60) Provisional application No. 62/161,696, filed on May 14, 2015.

(51) Int. Cl.
| F16L 3/22 | (2006.01) |
| H02G 3/04 | (2006.01) |
| F16L 3/08 | (2006.01) |
| F16L 3/223 | (2006.01) |

(52) U.S. Cl.
CPC .............. *H02G 3/0437* (2013.01); *F16L 3/08* (2013.01); *F16L 3/223* (2013.01)

(58) Field of Classification Search
None
See application file for complete search history.

(56) References Cited

U.S. PATENT DOCUMENTS

| 934,463 | A | 9/1909 | Ritter |
| 1,930,928 | A | 10/1933 | Dunlap, Sr. |
| 2,023,082 | A | 12/1935 | Knell |
| 2,661,483 | A | 12/1953 | Tortorice |
| 2,867,681 | A | 1/1959 | Huehnel |
| 2,889,016 | A | 6/1959 | Warren |
| 2,921,607 | A | 1/1960 | Caveney |
| 2,980,404 | A | 4/1961 | Andersen et al. |
| 4,907,766 | A | 3/1990 | Rinderer |
| 4,909,461 | A | 3/1990 | Collins |
| 4,957,251 | A * | 9/1990 | Hubbard .................... F16L 3/22 |
| | | | 248/126 |
| 5,060,892 | A | 10/1991 | Dougherty |
| 5,067,677 | A | 11/1991 | Miceli |
| 5,277,005 | A | 1/1994 | Hellwig et al. |
| 5,277,006 | A | 1/1994 | Ruster |
| 5,478,174 | A | 12/1995 | Lenhart |
| 5,593,115 | A | 1/1997 | Lewis |
| 5,615,850 | A | 4/1997 | Cloninger |
| 5,626,316 | A | 5/1997 | Smigel et al. |
| 5,634,614 | A | 6/1997 | Rinderer |
| 5,784,249 | A | 7/1998 | Pouliot |
| 5,833,179 | A | 11/1998 | VandenBerg |
| 5,834,693 | A | 11/1998 | Waddell et al. |
| 5,836,130 | A | 11/1998 | Unruh et al. |
| D407,963 | S | 4/1999 | Gretz et al. |
| 6,053,456 | A | 4/2000 | Dispenza |
| 6,101,773 | A | 8/2000 | Chau et al. |
| 6,170,784 | B1 | 1/2001 | MacDonald et al. |

(Continued)

OTHER PUBLICATIONS

United States Patent and Trademark Office, Office Action for U.S. Appl. No. 15/156,145, dated Nov. 1, 2016, 22 pages.

(Continued)

*Primary Examiner* — Monica E Millner
(74) *Attorney, Agent, or Firm* — Kolisch Hartwell, P.C.

(57) ABSTRACT

A bracket for supporting and protecting wires and cables above an electrical panel within a wall frame. The bracket may further include a legend for labeling and organizing the wires and cables.

17 Claims, 15 Drawing Sheets

(56) References Cited

U.S. PATENT DOCUMENTS

| | | | |
|---|---|---|---|
| 6,222,128 B1 | 4/2001 | Gretz | |
| 6,273,377 B1 * | 8/2001 | Archer | F16B 2/065 248/218.4 |
| 6,313,406 B1 | 11/2001 | Gretz | |
| 6,347,714 B1 | 2/2002 | Fournier et al. | |
| 6,423,898 B1 | 7/2002 | Croker | |
| 6,489,565 B1 | 12/2002 | Krietzman et al. | |
| 6,513,764 B2 * | 2/2003 | Koziol | F16L 3/04 248/49 |
| 6,513,766 B1 | 2/2003 | Gretz | |
| 6,595,476 B1 | 7/2003 | Edwards | |
| 6,605,782 B1 | 8/2003 | Krietzman et al. | |
| 6,655,644 B1 | 12/2003 | Gretz | |
| 6,706,969 B1 | 3/2004 | Young | |
| 6,818,834 B1 | 11/2004 | Lin | |
| 6,857,606 B1 | 2/2005 | Gretz | |
| 6,996,943 B2 | 2/2006 | Denier et al. | |
| 7,014,152 B2 | 3/2006 | Grendahl | |
| 7,039,965 B1 | 5/2006 | Ismert | |
| 7,091,418 B1 | 8/2006 | Clark et al. | |
| 7,119,282 B2 | 10/2006 | Krietzman et al. | |
| 7,131,792 B2 | 11/2006 | Doverspike | |
| 7,171,098 B2 | 1/2007 | Weinegger | |
| 7,200,931 B2 | 4/2007 | Clark et al. | |
| 7,223,052 B1 | 5/2007 | Evans | |
| 7,285,027 B2 | 10/2007 | McGrath et al. | |
| 7,345,239 B2 | 3/2008 | Tousignant et al. | |
| 7,345,241 B2 | 3/2008 | Caveney et al. | |
| 7,347,401 B1 | 3/2008 | Gretz | |
| 7,352,947 B2 | 4/2008 | Phung et al. | |
| 7,381,907 B1 | 6/2008 | Frusco | |
| 7,405,923 B2 | 7/2008 | Kelly et al. | |
| 7,438,265 B2 | 10/2008 | Urzua | |
| 7,533,852 B2 | 5/2009 | Stigler | |
| 7,592,543 B2 | 9/2009 | Caveney et al. | |
| 7,601,922 B2 | 10/2009 | Larsen et al. | |
| 7,608,782 B2 | 10/2009 | Hill | |
| 7,616,432 B2 | 11/2009 | Luebke et al. | |
| 7,667,137 B1 | 2/2010 | Beckman | |
| 7,693,387 B2 | 4/2010 | Weinegger et al. | |
| 7,712,709 B2 | 5/2010 | Winchester | |
| 7,823,846 B2 | 11/2010 | Williams, III | |
| 7,922,012 B2 | 4/2011 | Sisley | |
| 7,963,486 B2 | 6/2011 | Wilson et al. | |
| 8,020,811 B2 | 9/2011 | Nelson | |
| D663,274 S | 7/2012 | Gretz | |
| 8,262,035 B2 | 9/2012 | Bleus et al. | |
| 8,328,488 B2 | 12/2012 | Luk | |
| 8,330,043 B2 | 12/2012 | Alaniz et al. | |
| 8,351,753 B2 | 1/2013 | Taylor | |
| 8,371,540 B1 | 2/2013 | Medlin, Jr. | |
| 8,387,927 B1 | 3/2013 | Medlin, Jr. | |
| 8,435,086 B2 | 5/2013 | McGrath et al. | |
| 8,437,147 B2 | 5/2013 | Dean, Jr. et al. | |
| 8,464,984 B2 | 6/2013 | Laursen | |
| 8,464,985 B2 | 6/2013 | Mulch et al. | |
| 8,496,211 B2 | 7/2013 | Rinderer | |
| 8,505,858 B2 | 8/2013 | Hansen | |
| 8,565,572 B2 | 10/2013 | Krampotich et al. | |
| 8,668,174 B2 | 3/2014 | Kato | |
| D702,198 S | 4/2014 | Gretz | |
| 8,695,929 B2 | 4/2014 | Cox | |
| 8,746,633 B1 | 6/2014 | Medlin, Jr. | |
| 8,998,154 B2 | 4/2015 | Lupsa et al. | |
| 9,169,948 B2 | 10/2015 | Buttars | |
| 2001/0022231 A1 | 9/2001 | Dyer | |
| 2003/0188880 A1 | 10/2003 | McClellan et al. | |
| 2006/0005985 A1 | 1/2006 | L'Henaff et al. | |
| 2009/0179116 A1 | 7/2009 | St-Louis et al. | |
| 2010/0133391 A1 | 6/2010 | Taylor | |

OTHER PUBLICATIONS

United States Patent and Trademark Office, Office Action for U.S. Appl. No. 15/156,145, dated Mar. 1, 2017, 9 pages.

* cited by examiner

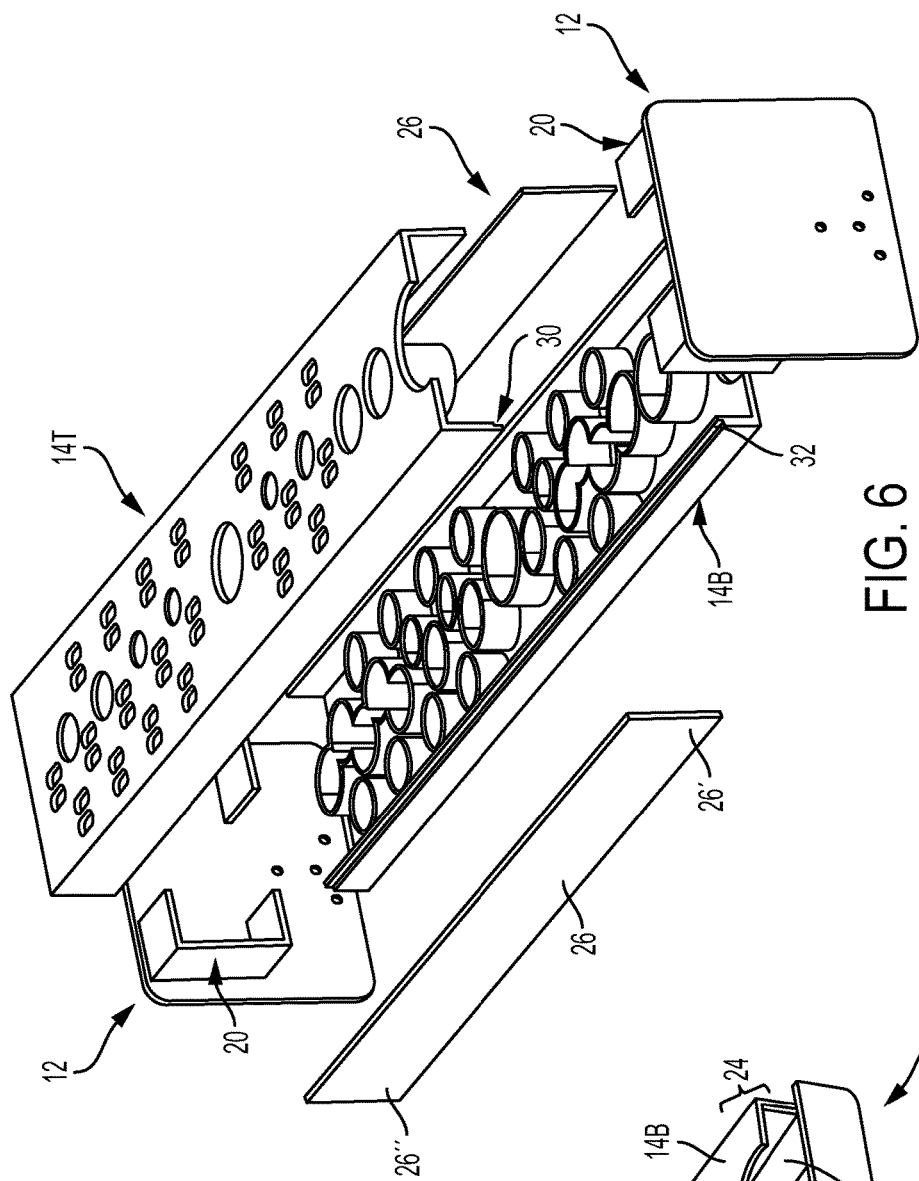
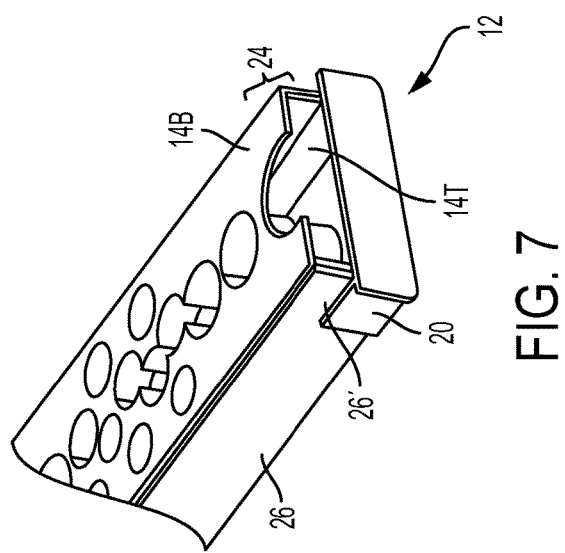

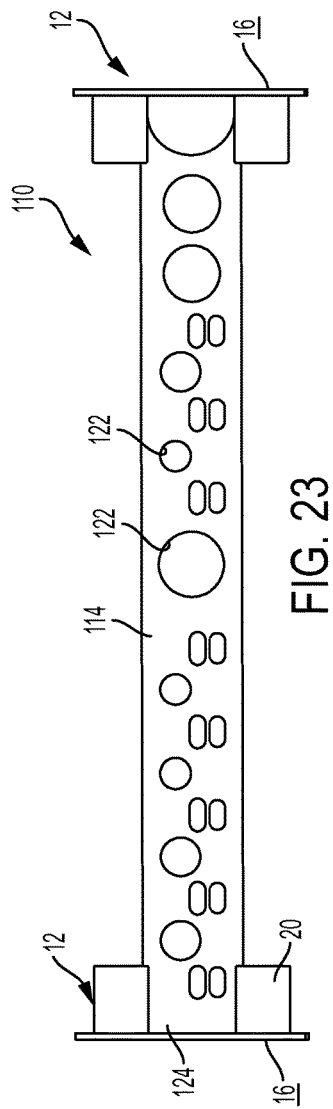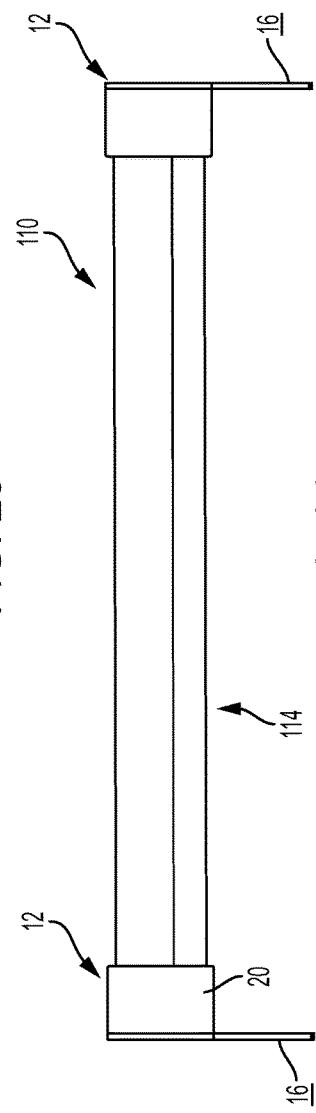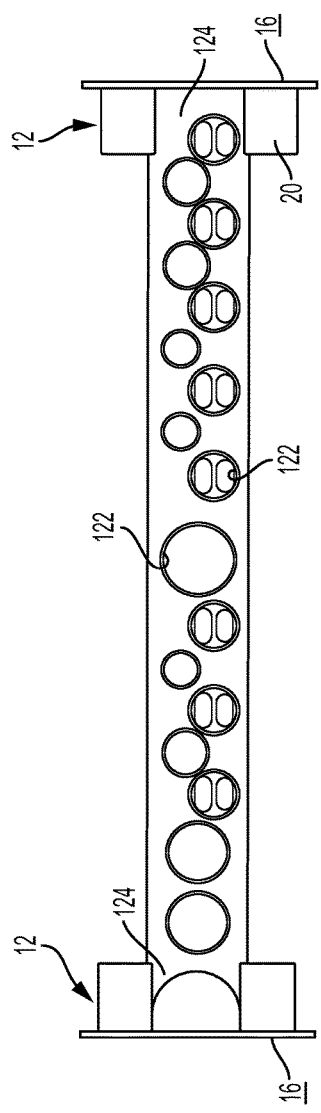

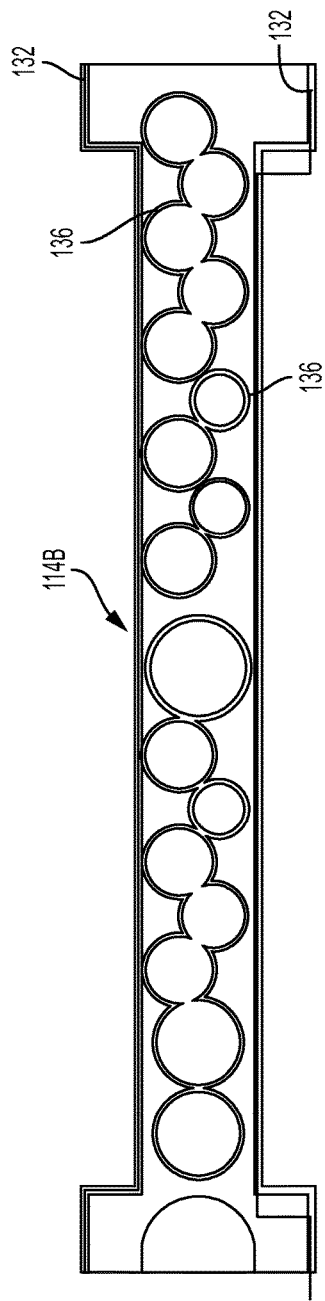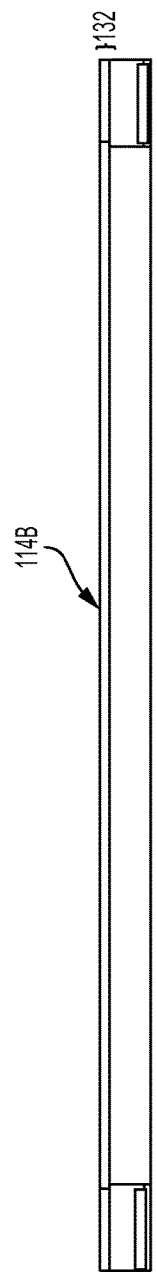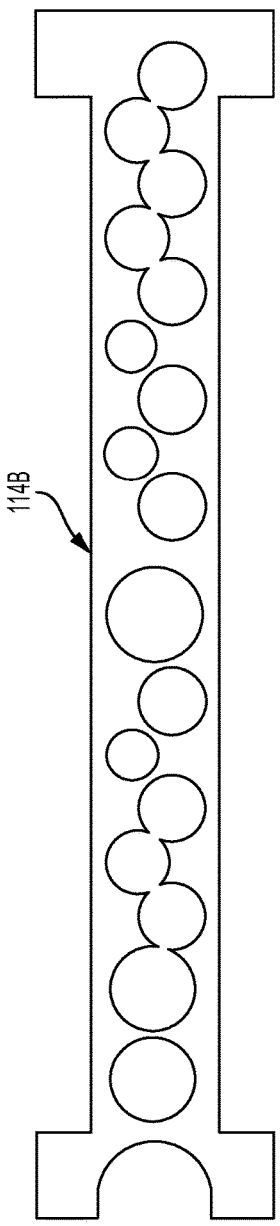

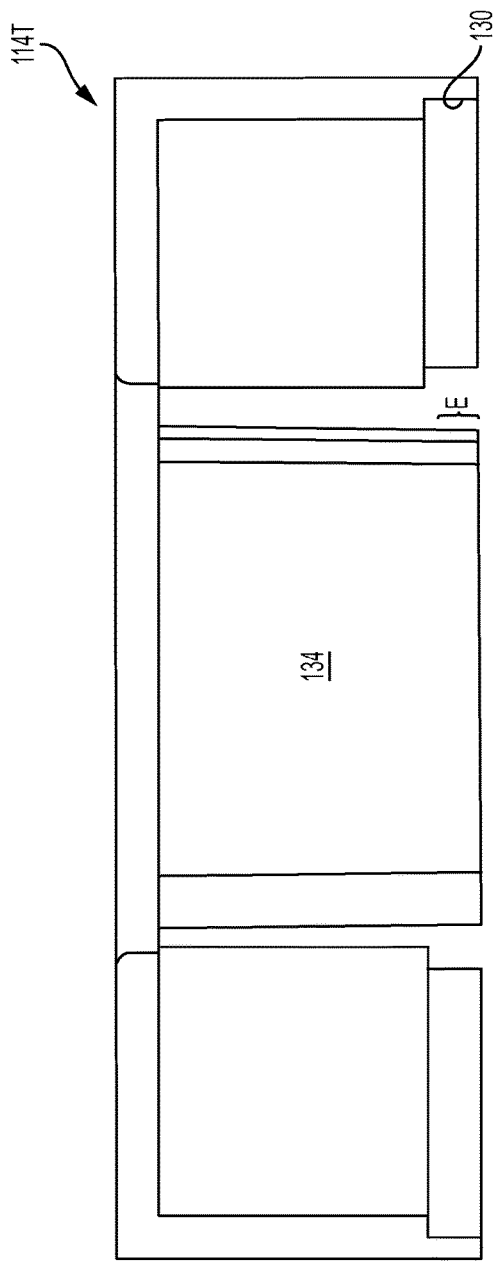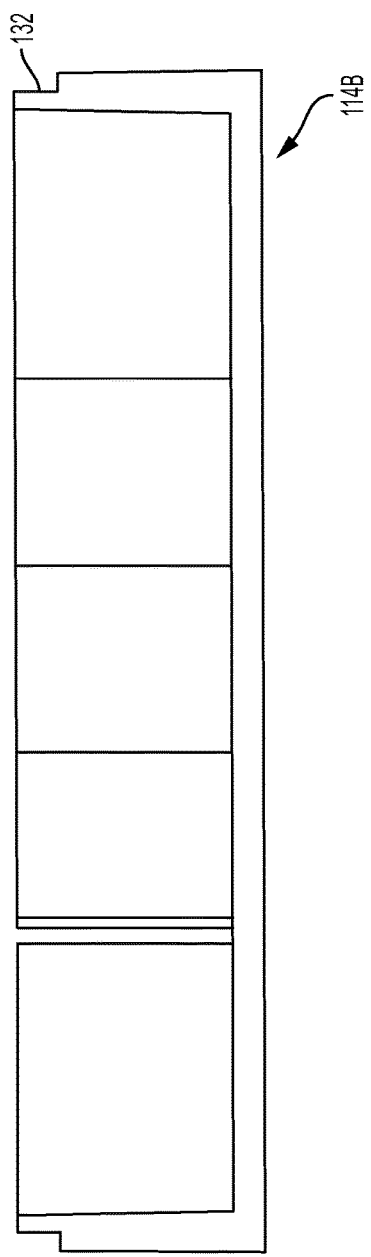
FIG. 32
FIG. 33

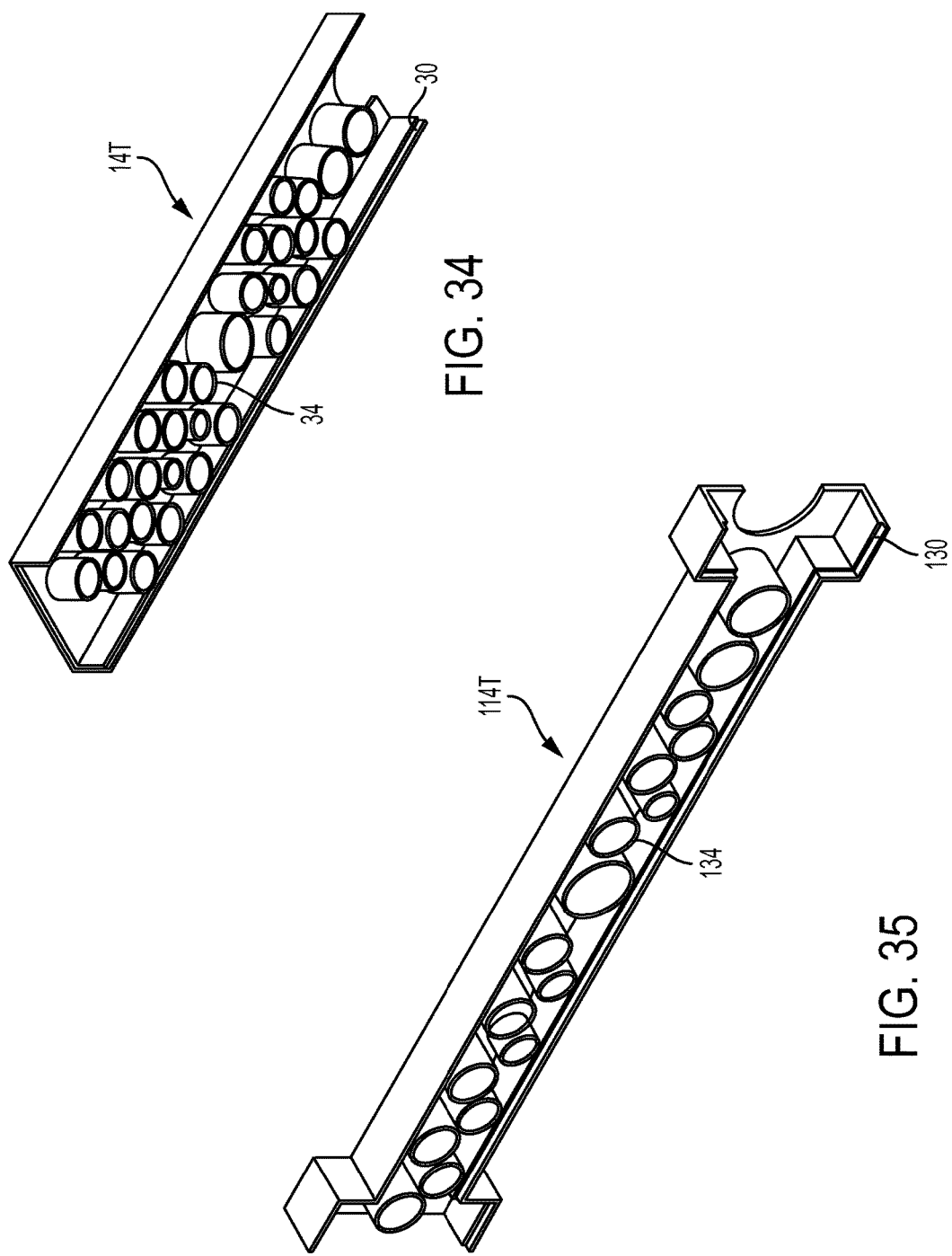

PANEL WIRE SUPPORT BRACKETS

CROSS-REFERENCE TO RELATED APPLICATIONS

This application is a continuation of U.S. patent application Ser. No. 15/156,145 and entitled PANEL WIRE SUPPORT BRACKETS, which claims priority to U.S. Provisional Patent Application Ser. No. 62/161,696 and entitled PANEL WIRE SUPPORT BRACKETS, the disclosures of which are incorporated herein by reference.

FIELD OF THE DISCLOSURE

This disclosure relates to PANEL WIRE SUPPORT BRACKETS. More particularly, the disclosure relates to systems and methods for supporting, protecting, organizing, and labeling electrical cables, for proper connection of those cables to an electrical panel.

BACKGROUND OF THE DISCLOSURE

Electrical panels, also known as main service panels, electrical main enclosures, or breaker boxes, are found in residential, commercial and industrial structures. Electrical panels provide a primary connection point for electricity supplied to the structure from an electrical utility, and contain numerous breakers and individualized terminations for electrical cable. That cable often takes the form of non-metallic sheathed cables (NM and NMC, also known as Romex-type cables, and SER cables) as often found in residential structures, or as conduit-protected cables as often found in commercial and industrial structures. Examples of electrical panels are disclosed in U.S. Pat. No. 5,784,249; U.S. Pat. No. 7,381,907; U.S. Pat. No. 7,405,923; U.S. Pat. No. 7,616,432; and U.S. D702198.

A primitive panel wire support found in many structures in the United States is a 2×4 or 2×6 that spans between two studs, approximately 12-inches above an electrical panel suspended between those two studs. The 2×6 is oriented with the nominal 6-inch dimension running up and down the corresponding wall, and cables or conduit are stapled to the exposed larger face of the 2×6. More specific wire supports are disclosed in U.S. Pat. No. 6,996,943 and U.S. Pat. No. 8,505,858. In new construction, a popular method for supporting wires is to cut a 2×6 piece of wood the size of the width of the panel and toenail said piece of wood between the studs above a panel 12 inches. Then lay the wires over the top of that 2×6 and individually staple wires against that piece of wood. Problems include the time and the effort involved, and possible damage to the Romex-type cables and wires before they reach the panel.

Other types of supports for wires, cables, and conduit are disclosed in U.S. Pat. No. 6,222,128; U.S. Pat. No. 6,313,406; U.S. Pat. No. 6,513,766; U.S. Pat. No. 6,655,644; U.S. Pat. No. 7,347,401; U.S. Pat. No. 7,608,782; U.S. D407963; and U.S. D663274.

The disclosures of these and all other publications referenced herein are incorporated by reference in their entirety for all purposes.

SUMMARY OF THE DISCLOSURE

The present panel wire support bracket is disclosed in several different embodiments. A carefully engineered bracket fits between two studs in a stud wall, and is attached at each side to one of the studs it is mounted between. The panel wire support bracket is preferably mounted approximately 12-inches above a service panel in new home construction or new building construction.

The top side of the panel wire support bracket has a series of holes going from top to bottom of the bracket through approximately a nominal two-inch thickness, similar to that of a 2×4. These holes are shaped and made for individual NM and NMC (Romex-type) cables. In some embodiments, the holes may be shaped and made for MC cables, of the type more commonly used in commercial work. The individual holes in the bracket are situated so as to be in a central plane of the wall containing the bracket and panel. Wires that might otherwise have been stapled to the side of the 2×6 piece of wood, are now supported approximately 12" above the panel by inserting the wires through the individual, designated holes, and terminating at the panel.

Some embodiments of the panel wire support bracket may include a legend area for marking the wire circuits, so that it is easy for an installer to determine which cable should be terminated to a particular breaker or terminal. Many embodiments of the panel wire support bracket are nonmetallic, but some embodiments may be metallic.

In use, an electrician will hold one of the disclosed support bars in place between 2 vertical studs with one hand, and use a power drill with a magnetized bit and a Philips screw bit in the other hand. A screw can be grabbed magnetically, after which the electrician uses the power drill to connect a left side of the support bar to a vertical stud within the wood frame. This may take less than 5 seconds. A few seconds later, the electrician can use the same step to connect a right side of the support bar to the frame, in the same fashion. The electrician will then proceed to insert several wire cables into the holes on a topside of the support bar and pull the cables through from a bottom of the support bar.

Advantages of the present disclosure will be more readily understood after considering the drawings and the Detailed Description.

BRIEF DESCRIPTION OF THE DRAWINGS

FIG. 6 shows an exploded isometric view of the bracket of FIG. 1.

FIG. 7 shows an isometric view of the bracket of FIG. 1, with portions removed to show elements of the bracket.

FIG. 23 shows a top view of the bracket of FIG. 21.

FIG. 24 shows a side view of the bracket of FIGS. 21 and 23.

FIG. 25 shows a bottom view of the bracket of FIGS. 21 and 23-24.

FIG. 29 shows a top view of a bottom section of a support bar, included in the bracket of FIG. 21.

FIG. 30 shows a side view of the bottom section of FIG. 29.

FIG. 31 shows a bottom view of the bottom section of FIGS. 29-30.

FIG. 32 shows an end view of the top section of FIGS. 26-28.

FIG. 33 shows an end view of the bottom section of FIGS. 29-31.

FIG. 34 shows an isometric view of the top section of FIGS. 8-10, viewed from below.

FIG. 35 shows an isometric view of the top section of FIGS. 26-28, viewed from below.

The drawings illustrate embodiments and schematic concepts for PANEL WIRE SUPPORT BRACKETS according to the invention. The purpose of these drawing is to aid in explaining the principles of the invention. Thus, the drawings should not be considered as limiting the scope of the invention to the embodiments and schematic concepts shown therein. Other embodiments of PANEL WIRE SUPPORT BRACKETS may be created which follow the principles of the invention as taught herein, and these other embodiments are intended to be included within the scope of patent protection.

DETAILED DESCRIPTION OF THE DISCLOSURE

Examples of panel wire support brackets are shown in FIGS. 1-33. Unless otherwise specified, a panel wire support bracket may, but is not required to contain at least one of the structure, components, functionality, and/or variations described, illustrated, and/or incorporated herein.

Figure 1:
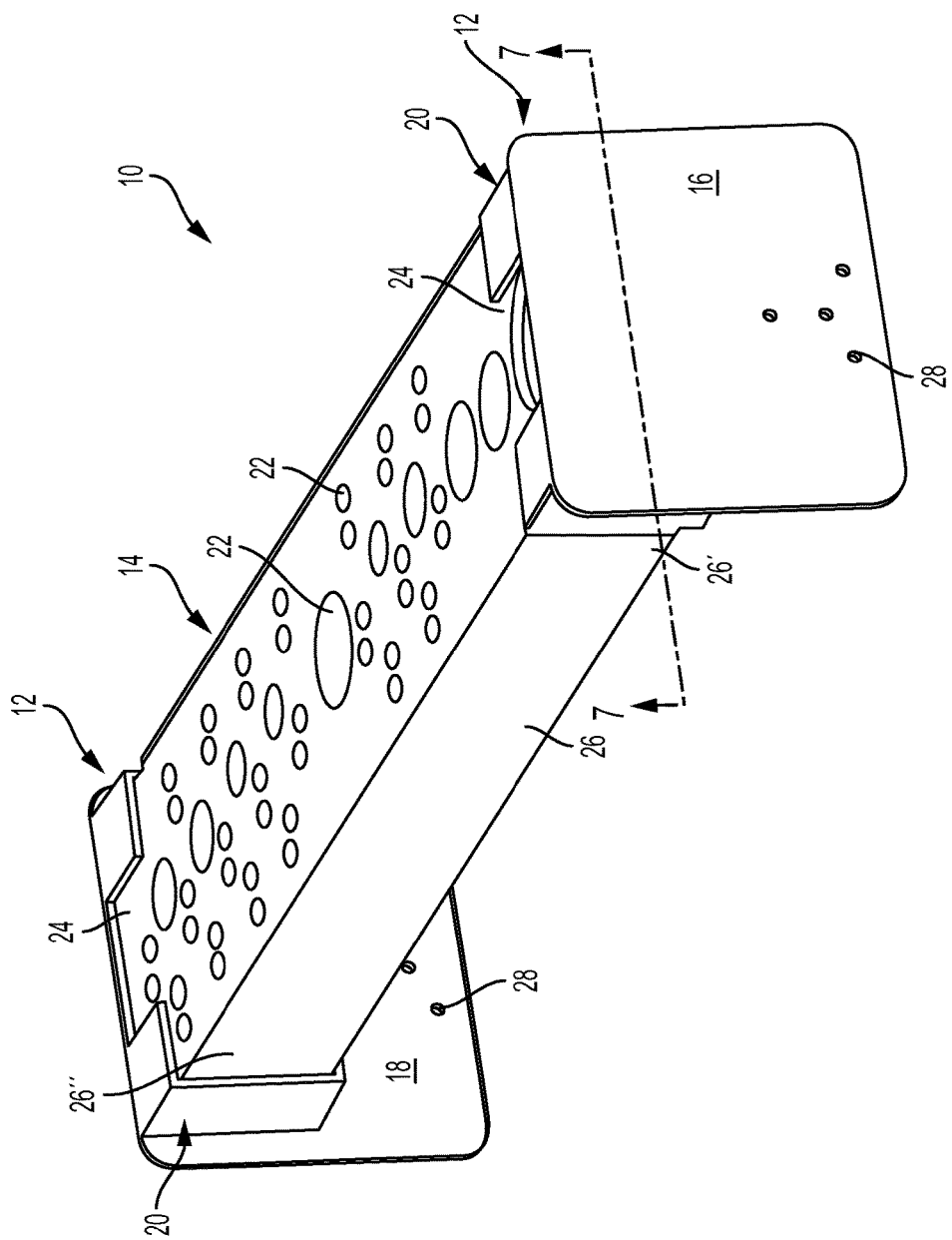
FIG. 1 shows an isometric view of a panel wire support bracket according to the present disclosure.
Figure 2:
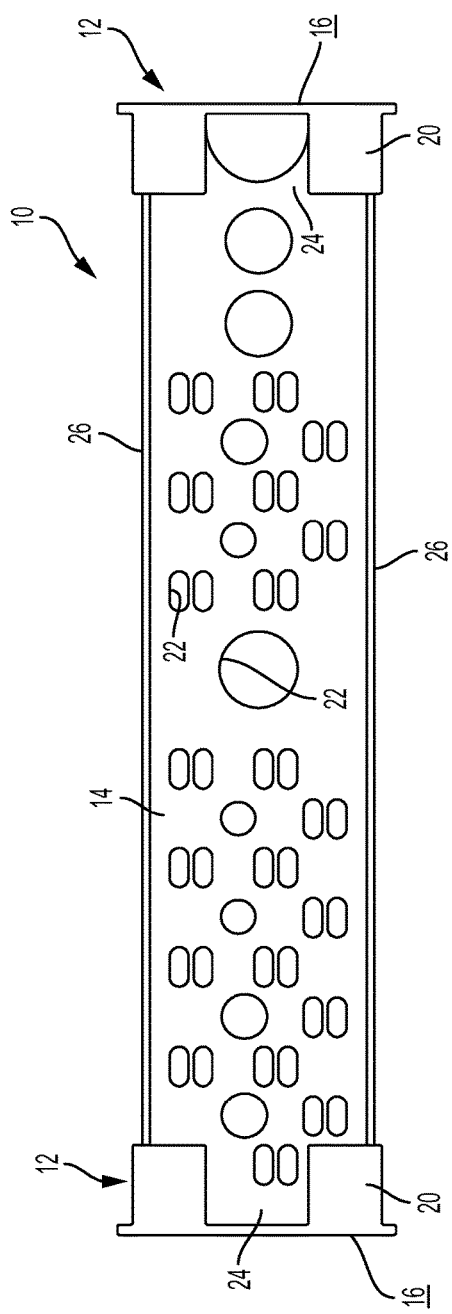
FIG. 2 shows a top view of the bracket of FIG. 1.
Figure 3:
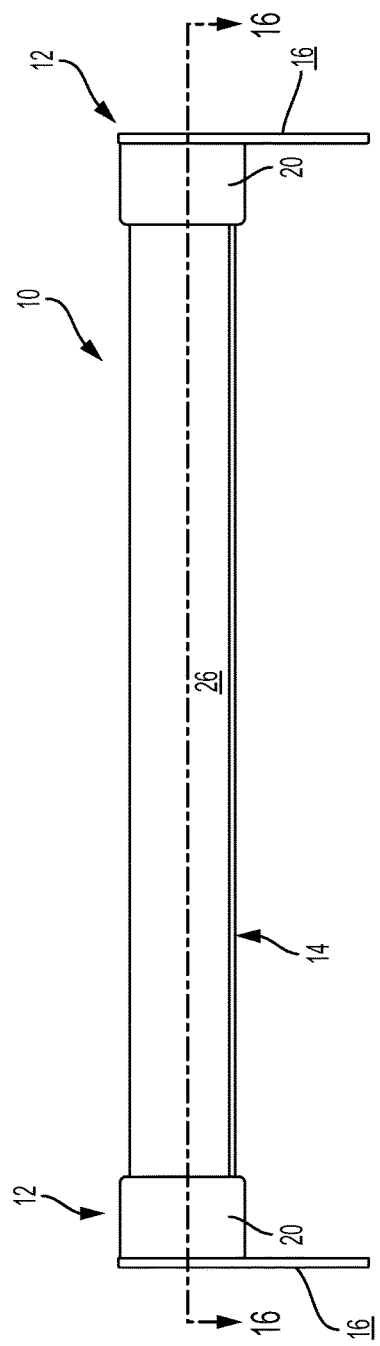
FIG. 3 shows a side view of the bracket of FIGS. 1-2.
Figure 4:
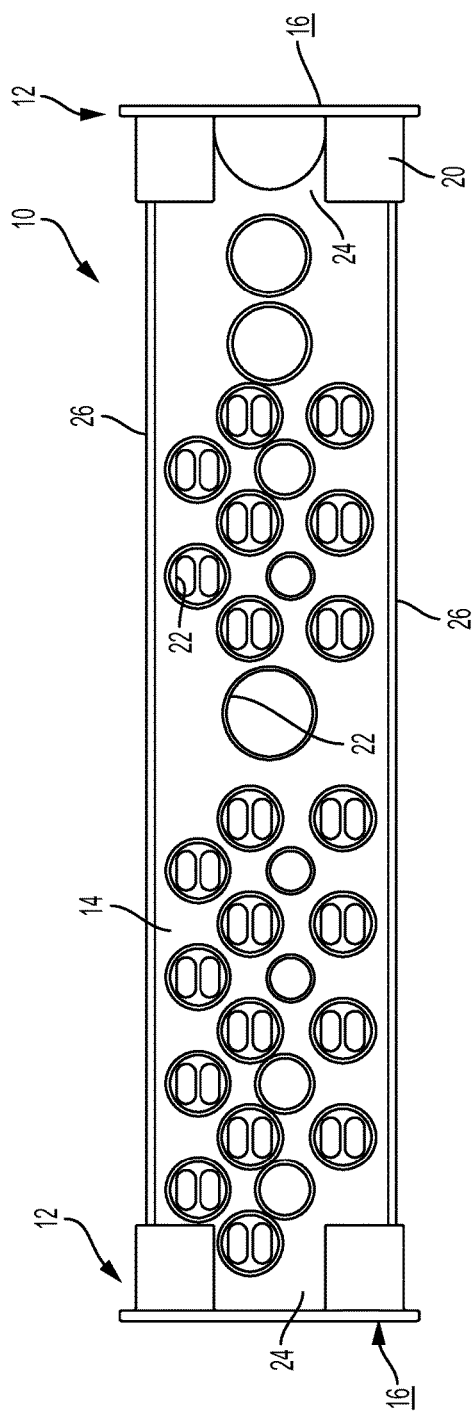
FIG. 4 shows a bottom view of the bracket of FIGS. 1-3.
Figure 5:
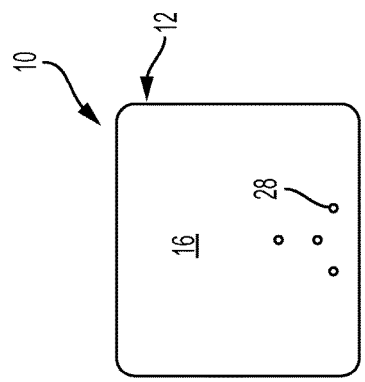
FIG. 5 shows an end view of the bracket of FIGS. 1-4.

A panel wire support bracket 10 is shown in FIG. 1. A preformed end cap 12 is provided at either end of bracket 10, interconnected by a preformed support bar 14.

Each end cap 12 is preferably identical. End cap 12 includes a stud face 16, which is preferably generally flat, as shown. A parallel opposite face is a support face 18, which is labeled on the other of the two end caps shown in FIG. 1. Support face 18 includes a retaining flange 20 extending outwardly from support face 18.

Support bar 14 is formed with a plurality of holes 22. Each end of support bar 22 is identified as a support end 24, and each support end 24 is sized to conform to and mate with a corresponding retaining flange 20 of one end cap 12.

Preferably, a protective plate 26 is held at an end 26', and also held at an opposite end 26". More specifically, plate 26 is trapped between a retaining flange 20 of one end cap 12, and a corresponding support end 24 of support bar 14. However, other methods of attachment may be possible, including adhesive, double-sided tape, or fasteners between plate 26 and support bar 14.

Plate 26 preferably is made of 16-gauge steel, which has been found to provide reasonable protection against nails that might otherwise pierce support bar 14, when in use. Other materials might provide adequate protection, as is allowed by national or local building codes. Furthermore, in some embodiments, support bar 14 may be molded from material strong enough to provide adequate protection, without the need for an added plate.

Bracket 10 is intended for installation inside a stud wall. This is made easier by the design of end cap 12, which is formed with predefined nail holes 28.

FIGS. 2-5 show other views of support bracket 10, with similar reference numbers used in all views.

Referring to FIG. 6, support bracket 10 is shown in exploded view, so that each of the components discussed above is shown separated from other components. The same reference numbers are used to label these components. As shown in FIG. 6, the support bar is formed from two pieces, including a top section 14T and a bottom section 14B. Portions of top section 14T and bottom section 14B interact to hold these two sections relative to each other, including a top lap 30, and a bottom lap 32. Furthermore, when top section 14T is mated with bottom section 14B, the resulting assembly, with or without plate 26, may be slid into a corresponding retaining flange 20. This corresponding retaining flange 20 keeps top section 14T aligned with bottom section 14B, once the entire assembly is installed inside a stud wall.

Referring to FIG. 7, the support bracket of FIG. 1 is shown inverted, with end cap 12 shown in cross section. Plate 26 is shown, trapped between retaining flange 20 of end cap 12, and a corresponding support end 24 of support bar 14.

Figure 8:
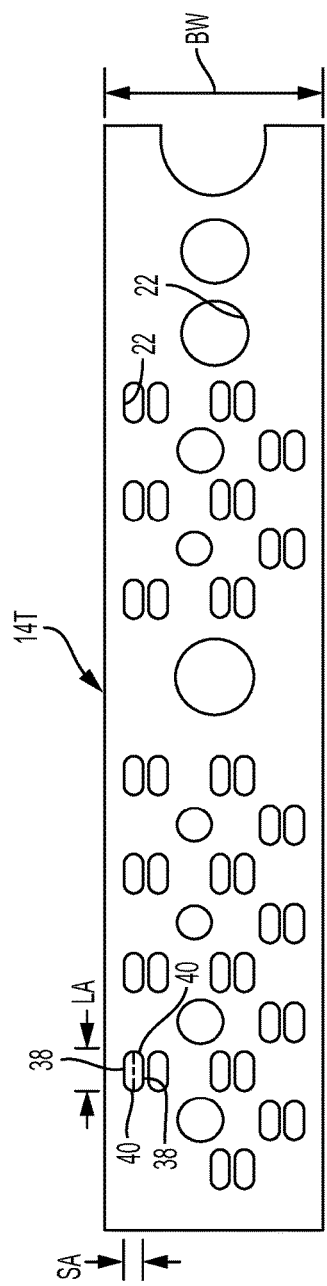
FIG. 8 shows a top view of a top section of a support bar, included in the bracket of FIG. 1.
Figure 9:
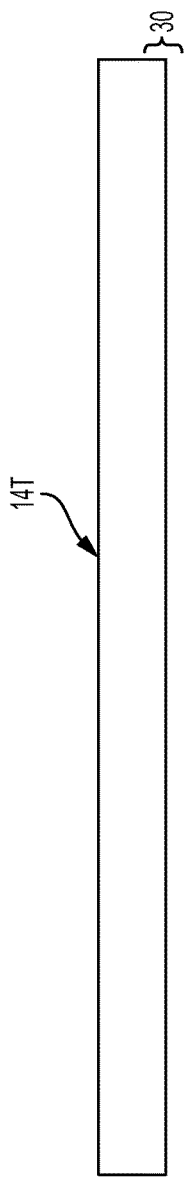
FIG. 9 shows a side view of the top section of FIG. 8.
Figure 10:
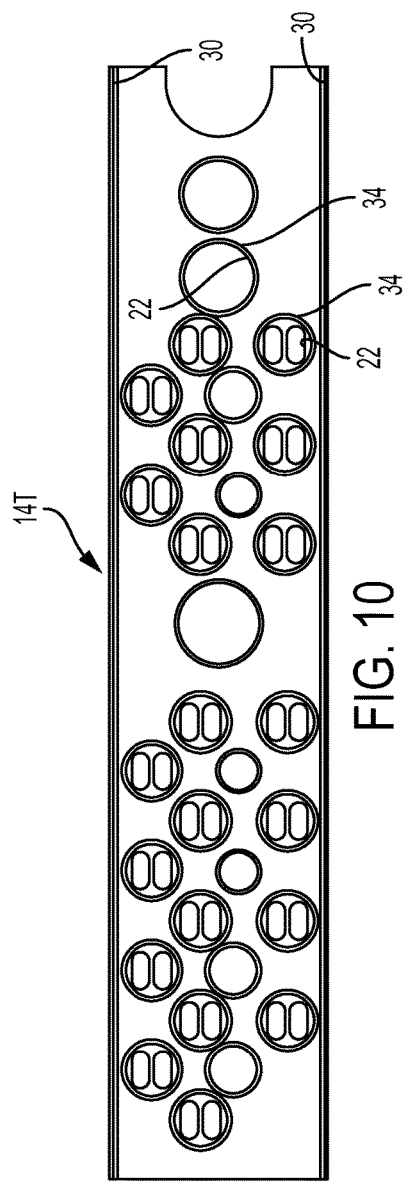
FIG. 10 shows a bottom view of the top section of FIGS. 8-9.

FIGS. 8-10 show top section 14T of the support bar. The plurality of holes 22 are formed in top section 14T of the support bar. When viewed from below, as in FIG. 10, it is seen that a plurality of top guide walls 34 extend downward from the plurality of holes 22.

Figure 11:
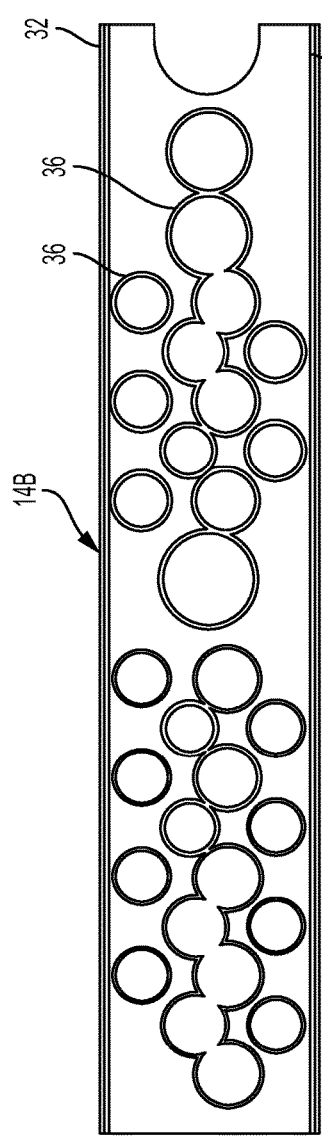
FIG. 11 shows a top view of a bottom section of a support bar, included in the bracket of FIG. 1.
Figure 12:
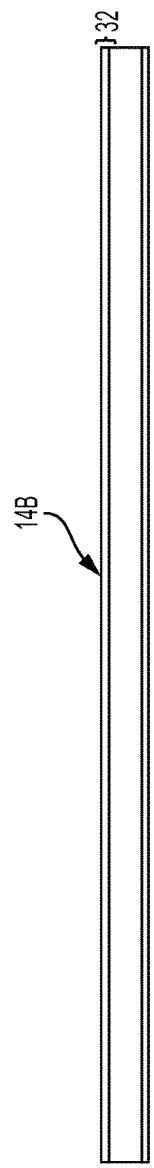
FIG. 12 shows a side view of the bottom section of FIG. 11.
Figure 13:
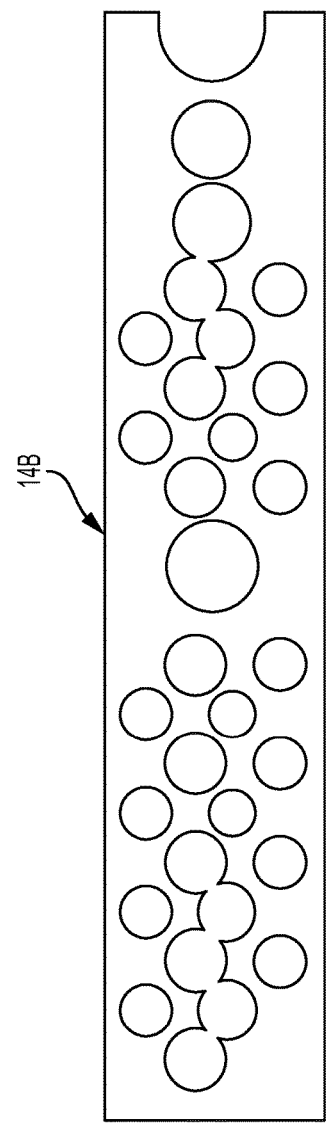
FIG. 13 shows a bottom view of the bottom section of FIGS. 11-12.

FIGS. 11-13 show bottom section 14B of the support bar. A plurality of bottom guide walls 36 extend upward from bottom section 14B.

Figure 14:
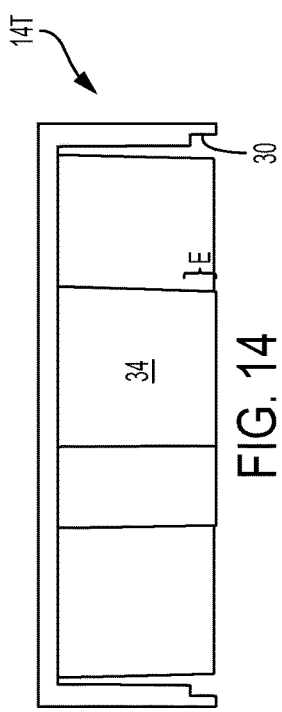
FIG. 14 shows an end view of the top section of FIGS. 8-10.
Figure 15:
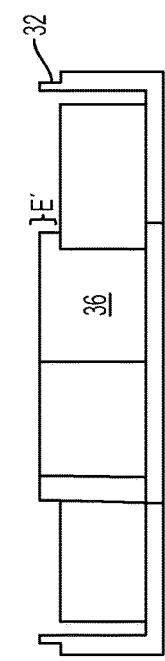
FIG. 15 shows an end view of the bottom section of FIGS. 11-13.

FIGS. 14 and 15 show end views of top section 14T of the support bar, and bottom section 14B of the support bar, respectively. Overlap occurs at lap 30 and lap 32, when top section 14T is mated with bottom section 14B, so that at least some of bottom guide walls 36 telescopingly encompass corresponding top guide walls 34. This is shown in cross-section in FIG. 16. Top guide walls 34 and bottom guide walls 36 collectively define tubes that extend from the top surface to the bottom surface of support bar 14, connecting a top hole to a bottom hole. A cable or wire pushed through a top hole will be easily guided through the bottom hole, making installation of cables and wires through the bracket both easier and more reliable.

Figure 16:
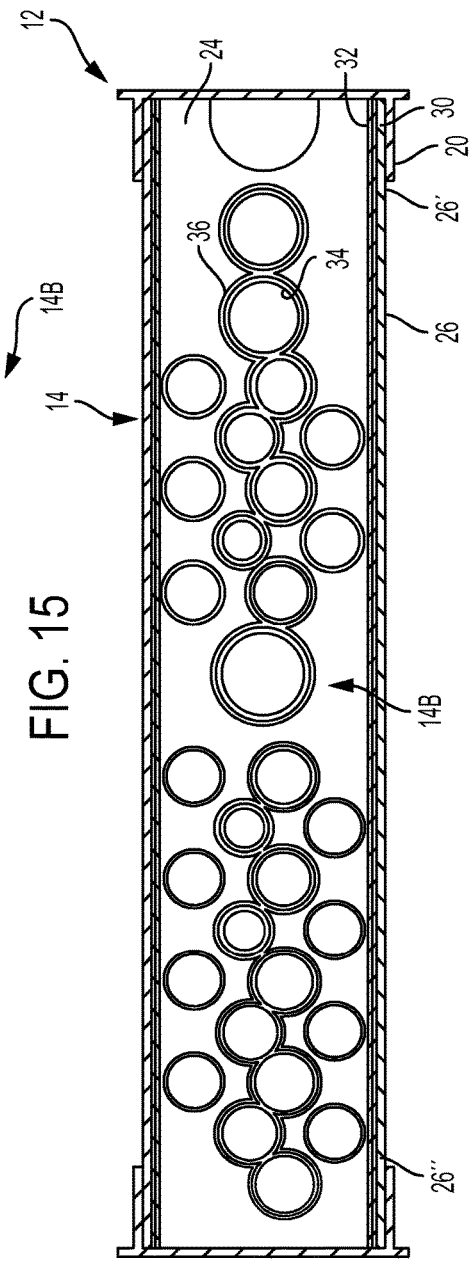
FIG. 16 shows a cross-sectional view of the bracket of FIG. 3, taken along like 16-16 in FIG. 3.
Figure 17:
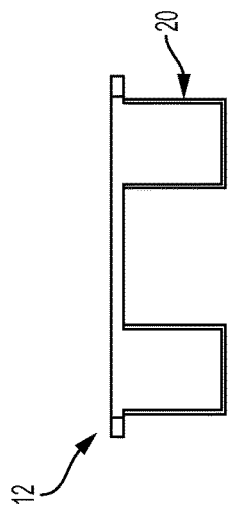
FIG. 17 shows a top view of an end cap included in the bracket of FIG. 1.

Also visible in FIG. 16 is plate 26, trapped between retaining flange 20 of end cap 12, and a corresponding support end 24 of support bar 14.

Figure 19:
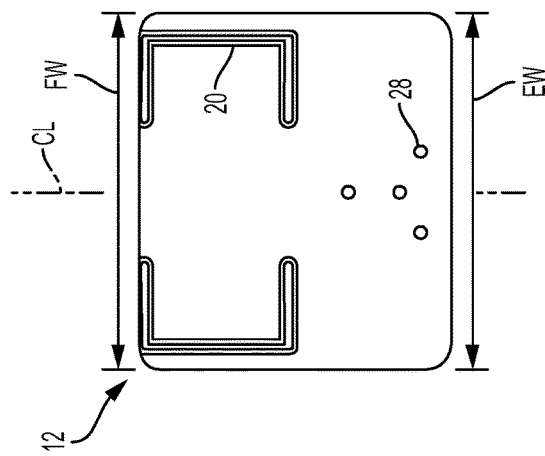
FIG. 19 shows an opposite end view of the end cap of FIGS. 17-18, showing a face opposite to the face seen in FIG. 5.
Figure 18:
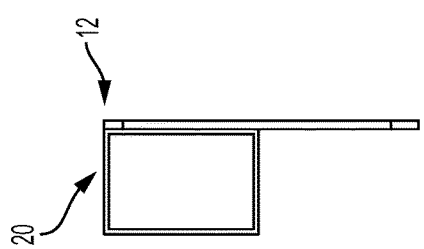
FIG. 18 shows a side view of the end cap of FIG. 8.
Figure 20:
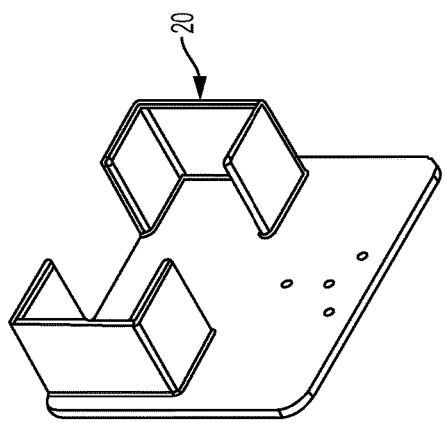
FIG. 20 shows an isometric view of the end cap of FIGS. 17-19, viewed from below.
Figure 21:
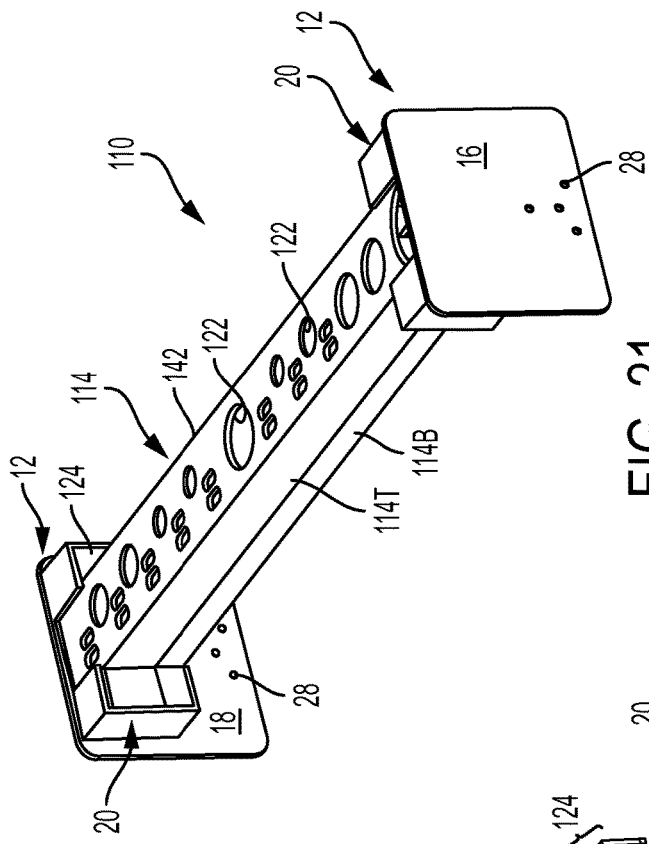
FIG. 21 shows an isometric view of another embodiment of a panel wire support bracket according to the present disclosure.

FIGS. 17-20 show one preformed end cap 12. The preformed end cap 12 defines an end width EW and an end vertical centerline CL between end width EW, as seen best in FIG. 19. Comparing FIG. 19 to FIGS. 1, 2, 4, and 16, it will be noted that support bar 14 is approximately centered along vertical centerline CL, when support bar 14 is held by end cap 12. Preferred dimensions are shown in FIG. 19, showing that EW is approximately 3.50-inches, which corresponds to a wide dimension of conventional 2×4 studs used in much residential construction.

Retaining flange 20 is shown in FIG. 19 defining a preferred flange width FW of 3.10-inches, when measured from outer walls of retaining flange 20. Flange width FW is less than end width EW, and support bar 14 is held within retaining flange 20. Accordingly, an assembled support bracket 10 will have a support bar 14 that defines a bar width BW (see FIG. 8) that is less than end width EW. It has been found that this results in an easy-to-install support bracket 10, with properly protected holes 22, while allowing adequate spacing for multiple holes 22, and while allowing easy access to all of the multiple holes 22. A preferred bar width is 2.75-inches, which allows a plate 26 inside flange 20, on either side of support bar 14. A preferred bar width is 14.03-inches, which allows the entire assembly to fit within conventional stud spacing, particularly above a main service panel, which is normally 14.25-inches wide. A preferred flange height is 1-inch, which allows some accommodation for stud spacing that might be a little wider than normal, if needed.

Referring once again to FIG. 8, at least one of the plurality of holes 22 is sized to have a long axis defining a length LA with approximately parallel flat walls 38, and a short axis perpendicular to the long axis defining a width SA, with semicircular end walls 40 connecting flat walls 38 across the width. Preferably the length of the long axis LA when measured from distal points of the semicircular end walls is approximately twice the width of the short axis SA.

More specifically, the width of the short axis SA is less than 0.28-inches. If sized correctly, this will allow most 12-2 and 14-2 flat NM cables to be passed through these flat-walled holes. However, most 12-3 and 14-3 NM cables used in the United States are round, and have a diameter that is larger than 0.28-inches. Thus, these larger cables are easier to pass through the round holes shown in FIG. 8. The available sizes of holes 22 are distributed to try to optimize cable placement, and encourage safe and efficient cable routing.

Preferred dimensions for the holes 22, shown most simply in FIG. 8, are as follows.

Flat-walled holes: LA of 0.5-inch, SA of 0.25-inch.

Circular holes, inner diameter: Three at 0.46-inch; Three at 0.6-inch; Two at 0.85-inch; and one at 1-inch.

Semicircular hole at one end, inner diameter: One at 1.33-inch.

A second embodiment of panel wire support bracket 110 is shown in FIGS. 21-32. A preformed end cap 12 may be used interchangeably with the embodiment of FIGS. 1-20, or with the embodiment of FIGS. 21-32. The end width EW, flange width FW, and end vertical centerline CL, as shown in FIG. 19, remain relevant for some of the following description of this second embodiment.

The primary differences between the embodiment of FIGS. 1-20, and the embodiment of FIGS. 21-32 are found in a preformed support bar 114. In the following description, similar parts between the two embodiments are identified with similar reference characters, preceded by the numeral "1".

In this embodiment, support bar 114 is shown to include a distinct support end 124 with a bar width BW, and a medial support body 142 with a reduced bar width RBW, preferably 1.5-inches. The at least 2:1 relative difference between end width EW and reduced bar width RBW has been found to provide a panel wire support bracket 110 that complies with many local building codes, without the expense or need for added protection, as discussed above with respect to plate 26. This is described more specifically, below, after reintroducing several components of support bar 114.

Support bar 114 is formed with a plurality of holes 122. Each end of support bar 122 is identified as a support end 124, and each support end 124 is sized to conform to and mate with a corresponding retaining flange 20 of one end cap 12.

Figure 22:
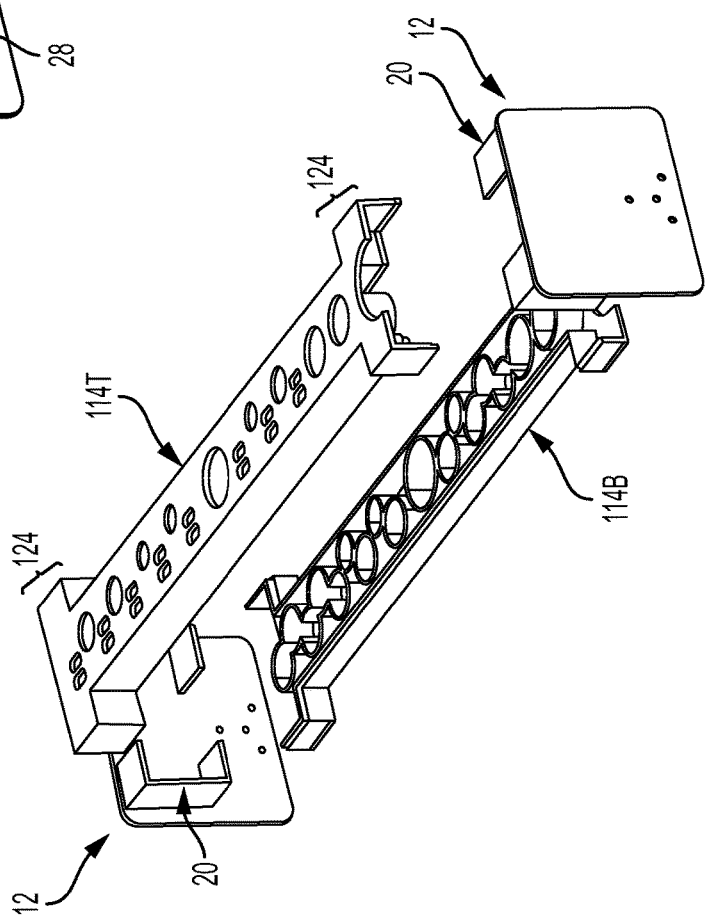
FIG. 22 shows an exploded isometric view of the bracket of FIG. 21.

Referring to FIG. 22, support bracket 110 is shown in exploded view, so that each of the components discussed above is shown separated from other components. The same reference numbers are used to label these components. As shown in FIG. 22, support bar 114 is formed from two pieces, including a top section 114T and a bottom section 114B. Portions of top section 114T and bottom section 114B interact to hold these two sections relative to each other, including a top lap 130, and a bottom lap 132. Furthermore, when top section 114T is mated with bottom section 114B, the resulting assembly, may be slid into a corresponding retaining flange 20. This corresponding retaining flange 20 keeps top section 114T aligned with bottom section 114B, once the entire assembly is installed inside a stud wall.

Figure 26:
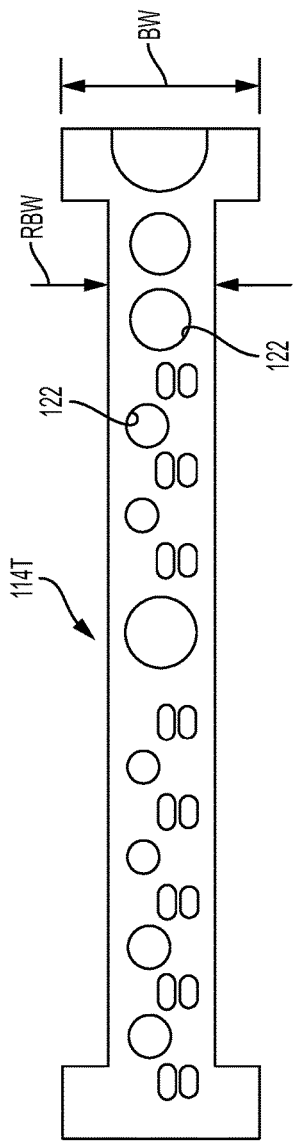
FIG. 26 shows a top view of a top section of a support bar, included in the bracket of FIG. 21.
Figure 27:
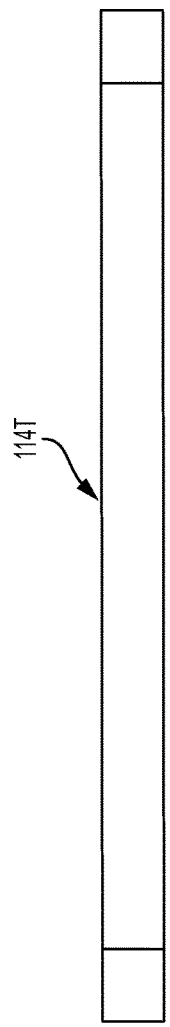
FIG. 27 shows a side view of the top section of FIG. 25.
Figure 28:
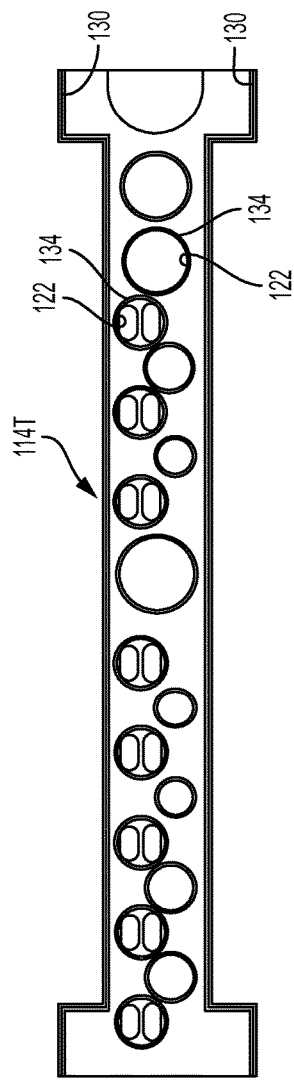
FIG. 28 shows a bottom view of the top section of FIGS. 26-27.

FIGS. 26-28 show top section 114T of support bar 114. The plurality of holes 122 are formed in top section 114T of the support bar. When viewed from below, as in FIG. 25, it is seen that a plurality of top guide walls 134 extend downward from the plurality of holes 122.

FIGS. 29-31 show bottom section 114B of support bar 114. A plurality of bottom guide walls 136 extend upward from bottom section 114B.

FIGS. 32 and 33 show end views of top section 114T of the support bar, and bottom section 114B of the support bar, respectively. Overlap occurs at lap 130 and lap 132, when top section 114T is mated with bottom section 114B, so that at least some of bottom guide walls 136 telescopingly encompass corresponding top guide walls 134.

Comparing FIG. 19 to FIGS. 21 and 23, it will be noted that support bar 114 is approximately centered along vertical centerline CL, when support bar 114 is held by end cap 12. Support bar 14 is held within retaining flange 20. Accordingly, an assembled support bracket 110 will have a support bar 114 that defines a bar width BW (see FIG. 26) that is less than end width EW. Support bar 114 also defines a reduced bar width RBW (see FIG. 26) that is less than each of end width EW, flange width FW, and bar width BW. It has been found that this results in an easy-to-install support bracket 110, with properly centered holes 122, while allowing adequate spacing for multiple holes 122, and while allowing easy access to all of the multiple holes 122.

Referring once again to FIG. 26, at least one of the plurality of holes 122 is sized to have a long axis defining a length LA with approximately parallel flat walls 138, and a short axis perpendicular to the long axis defining a width SA, with semicircular end walls 140 connecting flat walls 138 across the width. Preferably the length of the long axis LA when measured from distal points of the semicircular end walls is approximately twice the width of the short axis SA.

More specifically, the width of the short axis SA is less than 0.28-inches. If sized correctly, this will allow most 12-2 and 14-2 flat NM cables to be passed through these flat-walled holes. However, most 12-3 and 14-3 NM cables used in the United States are round, and have a diameter that is larger than 0.28-inches. Thus, these larger cables are easier to pass through the round holes shown in FIG. 8. The available sizes of holes 22 are distributed to try to optimize cable placement, and encourage safe and efficient cable routing.

Preferred dimensions for the holes 122, shown most simply in FIG. 26, are as follows.

Flat-walled holes: eight with LA of 0.5-inch, SA of 0.25-inch; and eight with a long axis of 0.5-inch and a short axis of 0.25-inch.

Circular holes, inner diameter: Three at 0.46-inch; Three at 0.6-inch; Two at 0.85-inch; and one at 1-inch.

Semicircular hole at one end, inner diameter: One at 1.33-inch.

Figure 36:
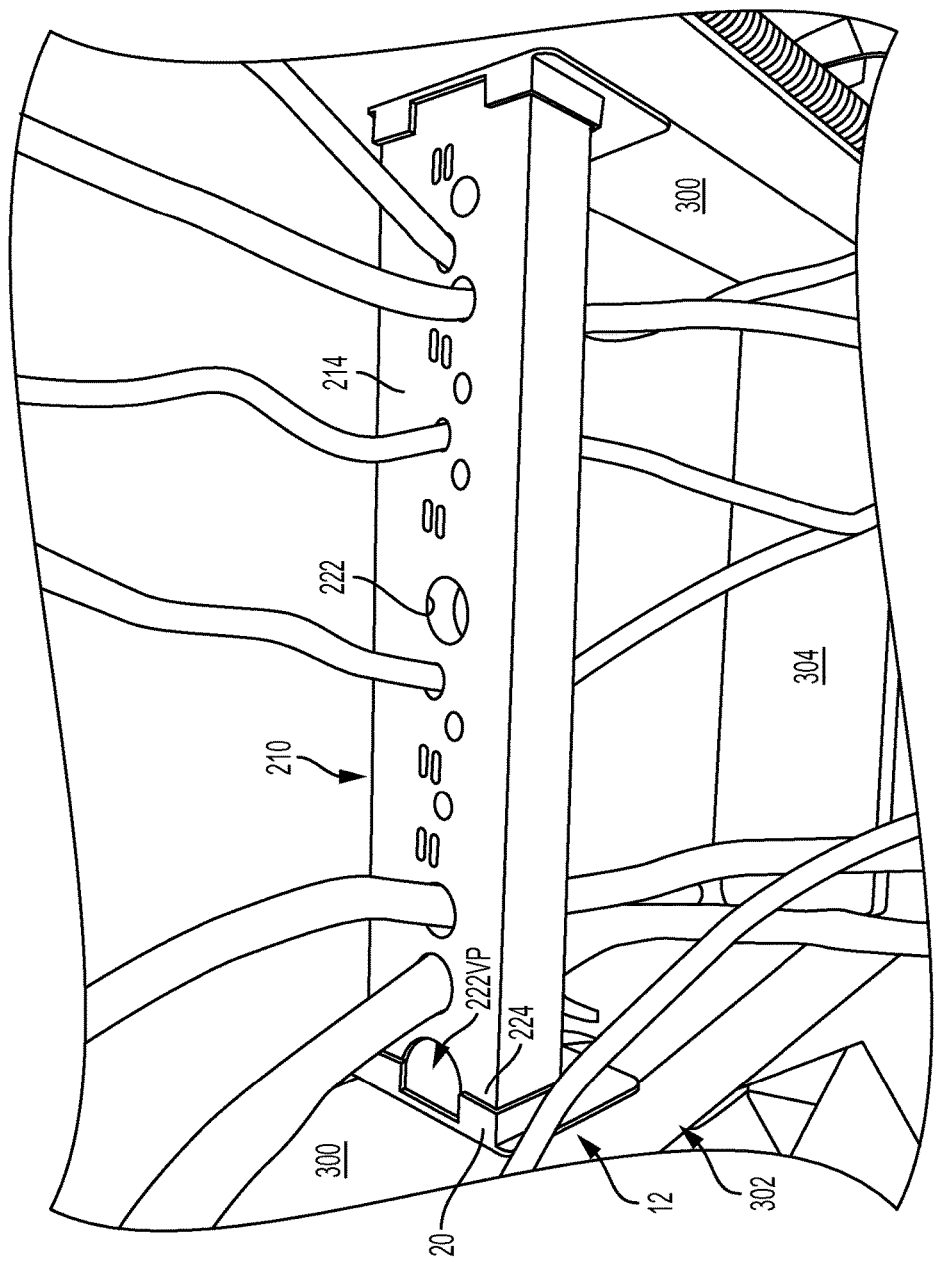
FIG. 36 shows a perspective view of another embodiment of a panel wire support bracket according to the present disclosure, installed in a stud wall, between two studs, and above an electrical panel.

Turning now to FIG. 36, yet another embodiment is shown, in the form of a panel wire support bracket 210. In the following description, similar parts between the first embodiment and this third embodiment are identified with similar reference characters, preceded by the numeral "2".

An end cap 12 is shown fastened to an inner face of a building stud 300, inside a stud wall 302, with a stud face of end cap 12 flush against stud 300. More specifically, two such end caps 12 are shown, at either end of a preformed support bar 214. Support bar 214 is thereby supported inside stud wall 302 by each end cap 12.

Each end cap 12 has been fastened to a corresponding stud 300, so that each end cap 12 is approximately centered relative to stud 300. This centered fastening is relatively easy to do, because end panel 12 has a width that is similar to and can be felt relative to a width of stud 300. Electricians are well trained on centering items of similar width, by feel.

A plurality of holes 222 in panel wire support bracket 210 are thereby centered inside stud wall 302. Holes 222 may be used for locating and slidably supporting a plurality of insulated electrical wires each passing through one of holes 222, as shown for six different wires.

End cap 12 is shown to include a retaining flange 20 is formed from at least two discontinuous walls leaving unobstructed vertical passage 222VP between the discontinuous walls when the end cap is fastened to a building stud. The discontinuous walls preferable are spaced apart by approximately 1.33-inch, corresponding to the inner diameter of the semicircular hole shown at one end of support bar 214. Described differently, support bar 214 is formed with an open cutout 222VP in a support end 224, so that an electrical wire may be fished through unobstructed vertical passage 222VP, even when end cap 12 is fastened to building stud 300 and support end 224 is mated with retaining flange 20.

FIG. 36 thus shows an example of a panel wire support bracket 210 providing wire and cable support. Panel wire support bracket 210 supports the wires and cables within holes 222 of panel wire support bracket 210. Panel wire support bracket 210 safely supports the wires and cables without the need for staples or similar attachment device. When fully installed, the wires and cables terminate at an electrical panel 304, and the alignment of the holes in panel wire support bracket 210 helps keep the wires centered in the stud space within wall 302, at the point of support, all along the width of panel wire support bracket 210.

From the three embodiments shown in the drawings, it is seen that many other words may be used to describe the novel features of the present disclosure. For example, using the reference characters of FIGS. 1-20, the present disclosure includes a panel wire support bracket 10, with a preformed end cap 12 defining an end width EW and a cap vertical centerline CL between end width EW. Bracket 10 includes a preformed support bar 14 extending from end cap 12. Support bar 14 is approximately centered along vertical centerline CL, and support bar 14 defines a bar width BW that is less than end width EW. Support bar 14 is formed with a plurality of holes 20, each hole 20 loosely conforming to an insulated electrical wire or conduit passing through each hole.

Preferably support bar 14 and end cap 12 slide together so that support bar 14 is held in place when end cap 12 is attached to an underlying structure. Support bracket 10 may further include a protective plate 26 held between end cap 12 and support bar 14. Protective plate 26 serves to protect wires passing through one or more of holes 20.

In all of the embodiments shown in the drawings, an end cap is formed separately from a support bar, and the support bar is formed from two pieces including a top section and a bottom section. For example, in FIGS. 1-20, these elements are identified at 12, 14, 14T, and 14B. However, there may be some embodiments where a support bar and at least one end cap are molded as a single element.

As a different example, using the reference characters of FIGS. 1-20, the present disclosure includes a panel wire support bracket 10 with a preformed end cap 12 defining an end width EW and a cap vertical centerline CL between end width EW. A preformed support bar 14 is shown extending from end cap 12. Support bar defines a bar width that is between 70-percent of end width EW and 90-percent of end width EW. Support bar 14 and end cap 12 are connected together by a proximal bar portion 24 so that support bar 14 is held in place when end cap 12 is attached to an underlying structure. Proximal bar portion 24 is sized to conform to and mate with retaining flange 20 of end cap 12.

Support bar 14 includes a protective plate 26 held along support bar 14 to help protect a plurality of wire passageways 22. Protective plate 26 is shown extending along support bar 14 to help protect a plurality of insulated electrical wires.

It should also be noted that the drawings portray a panel wire support bracket resembling a size similar to a 2×4, but some embodiments may vary in size.

As shown in the drawings, some embodiments include a panel wire support bracket that forms two surfaces making up a top surface and a bottom surface. The distance between the top and bottom surface is approximately two inches, however other embodiments may have shorter or longer distances between the top and bottom surface. The top and bottom surfaces oppose each other and contain holes made for individual NM and NMC (Romex-type) cables, or individual wires. In some embodiments, the holes may be shaped and made for MC cables. Various patterns and sizes of holes are possible. The individual holes on the surfaces often are situated so as to be in a central plane of the wall containing the panel wire support bracket and electrical panel.

In some embodiments, an area on the top surface and/or bottom surface may be pre-cut to be punched out before or after installation of the panel wire support bracket, or many years later. This enlarged knockout may provide an enlarged access hole to fish cables and wires through the wall.

As shown, the panel wire support bracket forms a front and back surface. In some embodiments, the front surface may be used as a legend area for marking the wire circuits.

Several of the embodiments shown are believed to be particularly efficient to manufacture and use, and correct use results in proper, safe alignment of wires and cables inside most construction environments. The panel wire support bracket of these embodiments includes a hollow main body, with separately molded end plates. A top of the hollow body includes shaped openings, some of which are located in closely aligned matching pairs, and others of which are enlarged relative to at least one of the closely aligned matching pairs. A bottom of the hollow body includes circularly shaped openings, with a singular circular opening corresponding to one or more of the closely aligned matching pairs.

The hollow body defines a first width, extending approximately perpendicular to a major lengthwise axis of the hollow body. Each one of the molded end plates defines a second width, wherein the second width is larger than the first width. Each one of the molded end plates also includes locating fins that correspond to an outer periphery of the hollow body, and that tightly hold the hollow body when the hollow body and two molded end plates are assembled. Preferably, the locating fins are distributed so that the first width of the hollow body is approximately centered relative to the second width of each one of the molded end plates. This results in proper spacing of the hollow body inside a structural wall, provided that each one of the molded end plates is approximately centered on a corresponding stud of the structural wall.

In the preferred embodiment, preformed holes are provided, for receiving screws, nails, or other fasteners extending through one of the molded end plates and into the corresponding stud.

The various embodiments of a panel wire support bracket shown in the drawings have dimensions carefully designed to provide an easy-to-manufacture panel wire support bracket, that is easy to install, quick and intuitive to use, and reliable for providing safe, repeatable spacing between major electrical conductors inside a structural wall.

While embodiments of panel wire support brackets have been particularly shown and described, many variations may be made therein. This disclosure may include one or more independent or interdependent embodiments directed to various combinations of features, functions, elements and/or properties. Other combinations and sub-combinations of features, functions, elements and/or properties may be claimed later in a related application. Such variations, whether they are directed to different combinations or directed to the same combinations, whether different, broader, narrower or equal in scope, are also regarded as included within the subject matter of the present disclosure. Accordingly, the foregoing embodiments are illustrative, and no single feature or element, or combination thereof, is essential to all possible combinations that may be claimed in this or a later application.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A panel wire support bracket for supporting a plurality of insulated electrical wires, comprising:
   a preformed end cap including a stud face;
   a preformed support bar formed with a plurality of holes for locating and slidably supporting a plurality of insulated electrical wires each passing through one of the holes, and formed with a front surface, a back surface, and a plurality of guide walls that extend downward from the plurality of holes so that the front surface and the back surface conform to and mate with the preformed end cap and overlap the plurality of guide walls;
   wherein:
   the support bar and the preformed end cap are molded as a single element;
   the end cap may be fastened to a building with the stud face flush against the building.

2. The support bracket of claim 1, further comprising:
   a protective plate extending along the support bar to help protect the plurality of insulated electrical wires.

3. The support bracket of claim 1, wherein the end cap is formed with predefined nail holes.

4. The support bracket of claim 1, wherein:
   the preformed end cap defines an end width and an end vertical centerline between the end width; and
   the support bar is approximately centered along the vertical centerline.

5. The support bracket of claim 4, wherein the support bar defines a bar width that is less than the end width.

6. A panel wire support bracket for supporting a plurality of insulated electrical wires, comprising:
   a preformed end cap including a stud face;
   a preformed support bar formed with a front surface, a back surface, and a plurality of holes for locating and slidably supporting a plurality of insulated electrical wires each passing through one of the holes, with the support bar and the preformed end cap connected together; and
   a plurality of guide walls that extend downward from the plurality of holes so that the front surface and the back surface conform to and mate with the preformed end cap and overlap the plurality of guide walls.

7. The support bracket of claim 6, further comprising a bottom section with a plurality of bottom guide walls that extend upward from the bottom section, and telescopingly encompass the guide walls of the preformed support bar.

8. The support bracket of claim 6, wherein:
   the retaining flange is formed from at least two discontinuous walls leaving unobstructed vertical passage between the discontinuous walls; and
   the support bar is formed with an open cutout in the support end;
   so that an electrical wire may be fished through unobstructed vertical passage, even when the support end is mated with the retaining flange.

9. The support bracket of claim 6, further comprising a protective plate held on the preformed support bar to protect wires passing through one or more of the plurality of holes.

10. A panel wire support bracket for supporting a plurality of insulated electrical wires, comprising:
a preformed end cap including a stud face;
a preformed support bar formed with a plurality of holes for locating and slidably supporting a plurality of insulated electrical wires each passing through one of the holes, and formed with a front surface, a back surface, and a plurality of top guide walls that extend downward from the plurality of holes so that the front surface and the back surface may conform to and mate with the preformed end cap and overlap the plurality of guide walls;
wherein:
the support bar and the preformed end cap are connected together;
at least one of the plurality of holes is sized to have a long axis defining a length with approximately parallel flat walls, and a short axis perpendicular to the long axis defining a width, with semicircular end walls connecting the flat walls across the width;
the length of the long axis when measured from distal points of the semicircular end walls is approximately twice the width of the short axis; and
the width is less than 0.28-inches.

11. The support bracket of claim 10, further comprising:
a protective plate held between the end cap and the support bar to protect wires passing through one or more of the holes.

12. The support bracket of claim 10, wherein the end cap is formed with predefined nail holes.

13. A panel wire support bracket, comprising:
a preformed end cap defining an end width and a cap vertical centerline between the end width; and
a preformed support bar extending from the end cap;
wherein:
the support bar is approximately centered along the vertical centerline;
the support bar defines a bar width such that there is at least a 2:1 relative difference between the end width and the bar width;
the support bar and the end cap are connected together by a proximal bar portion so that the support bar is held in place when the end cap is attached to an underlying structure;
the support bar is formed with a front surface, a back surface, and a plurality of wire passageways; and
a plurality of guide walls extend downward from the plurality of wire passageways so that the front surface and the back surface conform to and mate with the preformed end cap and overlap the plurality of guide walls.

14. The support bracket of claim 13, wherein the support bar is formed from two pieces including a top section and a bottom section.

15. The support bracket of claim 13, wherein:
the preformed end cap includes a stud face and a support face, and a retaining flange extending outwardly from the support face;
the proximal bar portion is sized to conform to and mate with the retaining flange of the end cap.

16. The support bracket of claim 15, wherein:
the retaining flange is formed from at least two discontinuous walls leaving unobstructed vertical passage between the discontinuous walls; and
the support bar is formed with an open cutout in the support end;
so that an electrical wire may be fished through unobstructed vertical passage, even when the support end is mated with the retaining flange.

17. The support bracket of claim 13, further comprising a protective plate held on the preformed support bar to protect one or more of the plurality of wire passageways.

* * * * *